US012806959B2

(12) United States Patent
Berahalli

(10) Patent No.: US 12,806,959 B2
(45) Date of Patent: Nov. 24, 2026

(54) VEHICULAR CABIN MONITORING SYSTEM WITH CABIN AIR QUALITY SENSOR

(71) Applicant: Magna Electronics Inc., Auburn Hills, MI (US)

(72) Inventor: Sreenivasa Reddy Berahalli, Novi, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 105 days.

(21) Appl. No.: 18/910,077

(22) Filed: Oct. 9, 2024

(65) Prior Publication Data

US 2025/0128568 A1 Apr. 24, 2025

Related U.S. Application Data

(60) Provisional application No. 63/591,799, filed on Oct. 20, 2023.

(51) Int. Cl.
*B60H 1/00* (2006.01)
*E05F 15/70* (2015.01)

(52) U.S. Cl.
CPC ......... *B60H 1/008* (2013.01); *B60H 1/00742* (2013.01); *B60H 1/00792* (2013.01); *E05F 15/70* (2015.01); *E05Y 2400/449* (2024.05); *E05Y 2900/55* (2013.01)

(58) Field of Classification Search
None
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,454,178 | B1 | 9/2002 | Fusco et al. |
| 7,914,187 | B2 | 3/2011 | Higgins-Luthman et al. |
| 8,718,536 | B2 | 5/2014 | Hannon |
| 9,662,976 | B2 | 5/2017 | Comeau et al. |
| 10,065,574 | B2 | 9/2018 | Tiryaki |
| 10,205,819 | B2 | 2/2019 | Hannon et al. |
| 11,518,401 | B2 | 12/2022 | Kulkarni |
| 11,639,134 | B1 | 5/2023 | Huizen et al. |
| 11,780,372 | B2 | 10/2023 | Sobecki et al. |
| 11,827,153 | B2 | 11/2023 | Miller et al. |
| 12,128,827 | B2 | 10/2024 | Huizen et al. |
| 12,134,358 | B2 | 11/2024 | Baur |
| 2010/0012417 | A1 | 1/2010 | Walter et al. |
| 2010/0251804 | A1 | 10/2010 | Morley et al. |

(Continued)

*Primary Examiner* — Shayne M. Gilbertson
(74) *Attorney, Agent, or Firm* — HONIGMAN LLP

(57) ABSTRACT

A vehicular cabin monitoring system includes an air sensing device disposed at a vehicular component disposed within an interior cabin of a vehicle. The air sensing device samples air at the vehicular component and generates sensor data representative of a sample of air at the vehicular component. The system, via processing of captured sensor data, determines a level of air contaminant within the interior cabin that is indicative of (i) a level of contaminant particulates and/or (ii) a level of contaminant gas. The system generates an alert to a driver of the vehicle and adjusts operation of a vehicular system responsive to determination that the level of air contaminant is greater than a threshold level.

25 Claims, 2 Drawing Sheets

(56) References Cited

U.S. PATENT DOCUMENTS

| | | | | |
|---|---|---|---|---|
| 2010/0294583 | A1 | 11/2010 | Biondo et al. | |
| 2012/0182242 | A1* | 7/2012 | Lindahl | G02F 1/157 345/173 |
| 2012/0236136 | A1 | 9/2012 | Boddy | |
| 2013/0338880 | A1 | 12/2013 | Connerty et al. | |
| 2015/0294169 | A1 | 10/2015 | Zhou et al. | |
| 2015/0296135 | A1 | 10/2015 | Wacquant et al. | |
| 2016/0312718 | A1 | 10/2016 | Dudar | |
| 2017/0217367 | A1 | 8/2017 | Pflug et al. | |
| 2017/0274906 | A1 | 9/2017 | Hassan et al. | |
| 2017/0294100 | A1 | 10/2017 | Haskew et al. | |
| 2018/0222414 | A1 | 8/2018 | Ihlenburg et al. | |
| 2018/0231976 | A1 | 8/2018 | Singh | |
| 2018/0235581 | A1 | 8/2018 | Vianello | |
| 2018/0334013 | A1 | 11/2018 | Koravadi | |
| 2019/0009715 | A1 | 1/2019 | Gage et al. | |
| 2019/0084369 | A1* | 3/2019 | Duan | B60H 1/008 |
| 2019/0210615 | A1 | 7/2019 | Caron et al. | |
| 2019/0366793 | A1* | 12/2019 | Giordano | B60H 1/00742 |
| 2020/0143560 | A1 | 5/2020 | Lu et al. | |
| 2020/0202151 | A1 | 6/2020 | Wacquant | |
| 2020/0320320 | A1 | 10/2020 | Lynam | |
| 2021/0291739 | A1* | 9/2021 | Kasarla | B60R 1/04 |
| 2021/0309073 | A1 | 10/2021 | Goel | |
| 2021/0323473 | A1 | 10/2021 | Peterson et al. | |
| 2022/0001999 | A1* | 1/2022 | Pearce | G01N 33/0063 |
| 2022/0055456 | A1* | 2/2022 | Varughese | B60H 3/0085 |
| 2022/0126457 | A1 | 4/2022 | Wu et al. | |
| 2022/0194182 | A1* | 6/2022 | Mou | B60H 3/0078 |
| 2022/0242438 | A1 | 8/2022 | Sobecki et al. | |
| 2022/0254132 | A1 | 8/2022 | Rother | |
| 2022/0377219 | A1 | 11/2022 | Conger et al. | |
| 2024/0017610 | A1 | 1/2024 | Ravichandran et al. | |
| 2024/0042826 | A1 | 2/2024 | Ravichandran et al. | |
| 2024/0051370 | A1 | 2/2024 | Ljungblad et al. | |
| 2025/0083661 | A1* | 3/2025 | Hosey | B60H 1/008 |

* cited by examiner

VEHICULAR CABIN MONITORING SYSTEM WITH CABIN AIR QUALITY SENSOR

CROSS REFERENCE TO RELATED APPLICATION

The present application claims the filing benefits of U.S. provisional application Ser. No. 63/591,799, filed Oct. 20, 2023, which is hereby incorporated herein by reference in its entirety.

FIELD OF THE INVENTION

The present invention relates generally to a vehicle sensing system for a vehicle and, more particularly, to a vehicle sensing system that utilizes one or more air quality sensors at a vehicle.

BACKGROUND OF THE INVENTION

Use of cameras or imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is also known to implement a camera within the cabin of the vehicle for use in monitoring the driver of the vehicle, such as to determine driver attentiveness or gestures made by the driver.

SUMMARY OF THE INVENTION

A vehicular cabin monitoring system includes an air sensing device disposed at a vehicular component disposed at an interior portion of a cabin of a vehicle equipped with the vehicular cabin monitoring system. For example, the air sensing device is disposed at an interior rearview mirror assembly or an overhead console module or a windshield-mounted forward-viewing camera module. The air sensing device samples air at the vehicular component and generates sensor data representative of a sample of air at the vehicular component. An electronic control unit (ECU) includes electronic circuitry and associated software. The electronic circuitry includes a data processor configured to process sensor data captured by the air sensing device. The vehicular cabin monitoring system, based on processing at the ECU of sensor data captured by the air sensing device, determines a level of air contaminant within the interior cabin of the vehicle that is indicative of at least one selected from the group consisting of (i) a level of contaminant particulates within the cabin of the vehicle and (ii) a level of contaminant gas within the cabin of the vehicle. The vehicular cabin monitoring system generates an alert to a driver of the vehicle in response to determining that the level of air contaminant is greater than a threshold level of harmful gas.

These and other objects, advantages, purposes and features of the present invention will become apparent upon review of the following specification in conjunction with the drawings.

DESCRIPTION OF THE PREFERRED EMBODIMENTS

Figure 1:
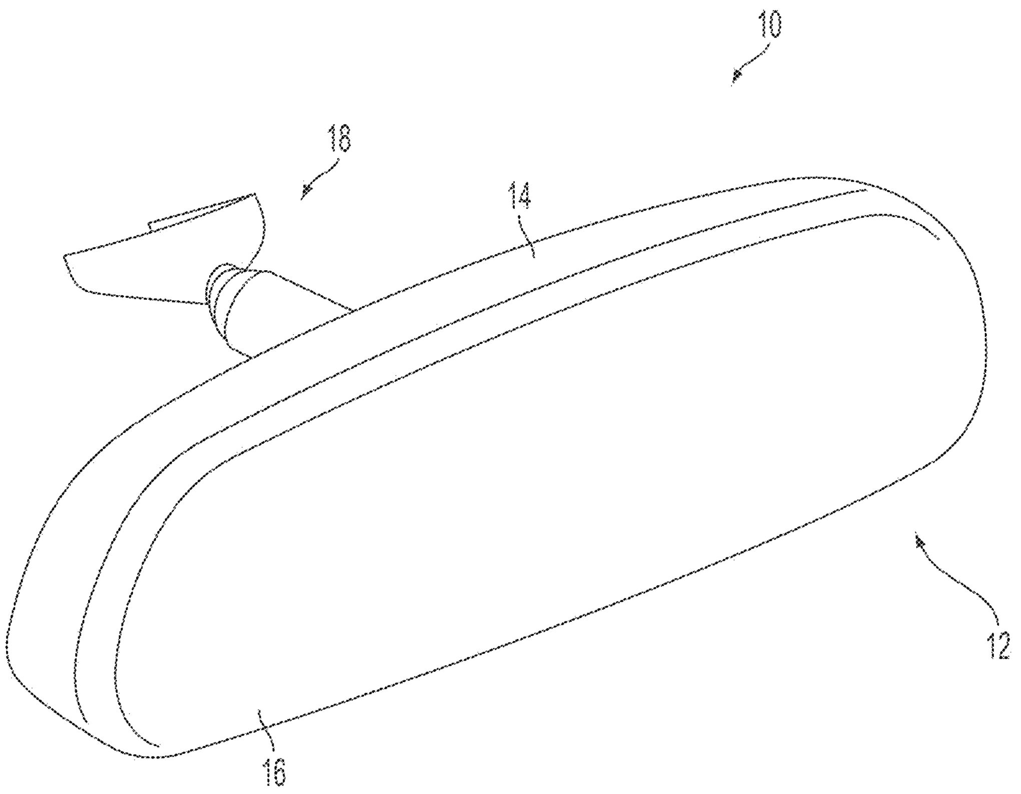
FIG. 1 is a perspective view of an interior rearview mirror assembly.

Referring now to the drawings and the illustrative embodiments depicted therein, an interior rearview mirror assembly 10 for a vehicle includes a mirror head 12 that includes a mirror casing 14 and a mirror reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or base or mounting configuration or assembly 18. The interior rearview mirror assembly 10 accommodates a mirror reflective element 16 and may include any suitable construction. For example, the mirror reflective element 16 of the interior rearview mirror assembly 10 may include a variable reflectance electro-optic mirror reflective element or a prismatic reflective element. Optionally, the interior rearview mirror assembly may comprise a dual-mode interior rearview video mirror that can switch from a traditional reflection mode to a live-video display mode.

Drivers and occupants often spend significant time in their vehicles (some studies have found that Americans spend up to 10 hours and 50 minutes or more per week travelling in their vehicles). Modern vehicles include an increasing number of safety measures, including driver monitoring and occupant monitoring systems including cameras and/or radar sensors that monitor the driver and/or occupants within the vehicle, such as to determine driver attentiveness. However, vehicles typically do not include systems for detecting and/or alerting drivers to the air quality within the vehicle cabin and often the only action for improving the cabin air quality is manually inspecting and replacing an air cabin filter of the vehicle. The air quality within the cabin of the vehicle may be reduced based on poor quality air (carrying particulates and/or harmful gasses) entering the cabin from the environment and/or the air cabin filter needing replacement (and thus being clogged and/or not adequately filtering air circulating within and entering the cabin).

As discussed further below, the cabin monitoring system actively monitors air quality within the cabin of the vehicle, detects poor or reduced air quality, generates an alert to the driver of the vehicle based on the detected reduced air quality, and may perform an action to counteract the reduced air quality and/or improve the air quality within the cabin of the vehicle. The cabin monitoring system includes a sensor or air quality sensing device configured to determine presence and concentration levels of toxic, combustible and otherwise harmful gasses, such as carbon monoxide (CO), carbon dioxide (CO2), nitrogen oxide (NO2) and/or volatile organic compounds (VOCs) and other harmful gasses at the interior cabin of the vehicle. Further, the sensor may be configured to determine presence and concentration of particulate matter (e.g., dust and pollen) and smoke within the air.

Figure 2:
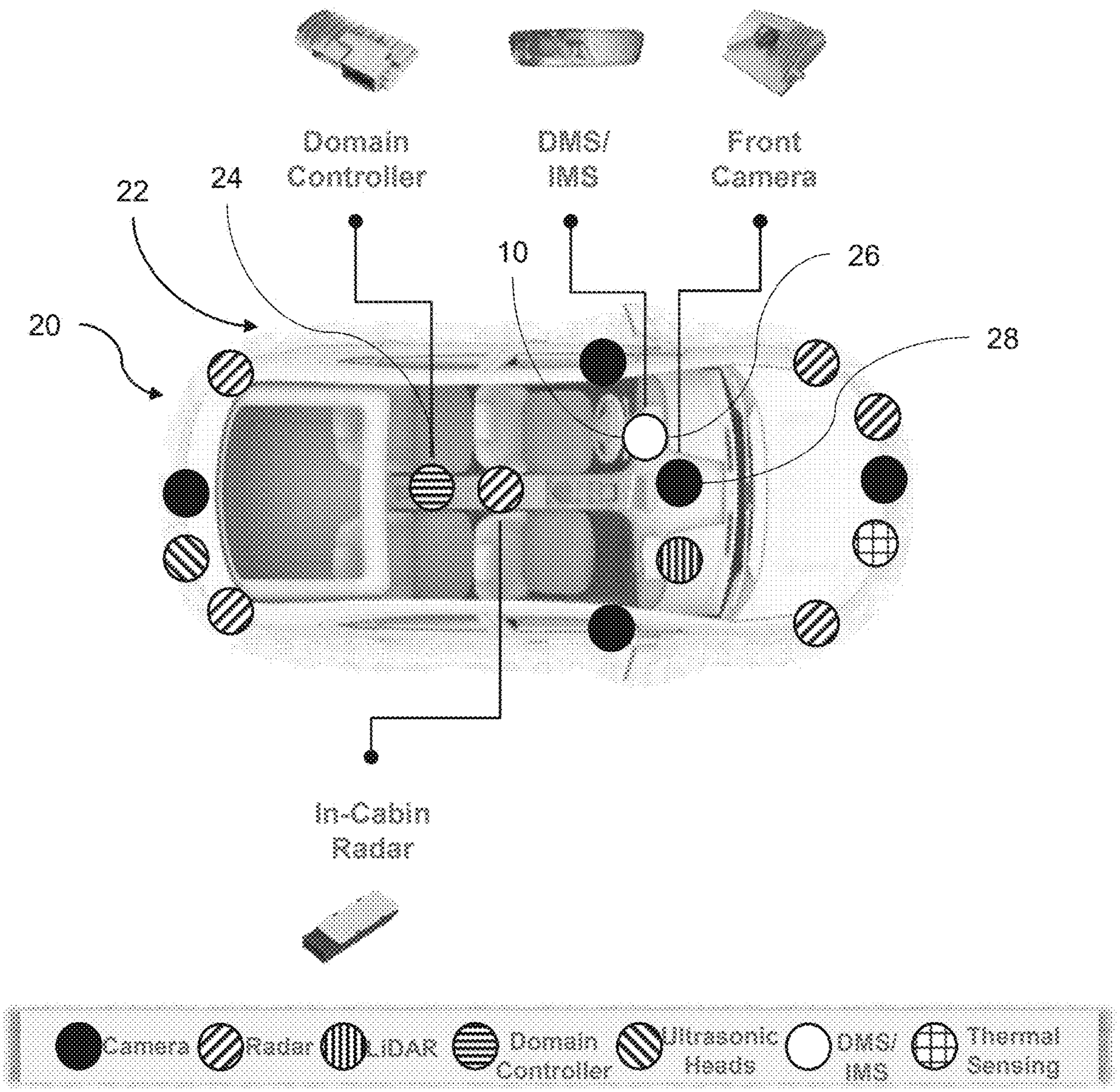
FIG. 2 is a plan view of a vehicle with a cabin monitoring system.

Referring to FIG. 2, the vehicle 20 equipped with the cabin monitoring system 22 includes an electronic control unit (ECU) 24 including electronic circuitry and associated software, where the electronic circuitry includes a data processor configured to process sensor data captured by the air quality sensing device 26. The ECU 24 may be disposed at the mirror assembly 10 (such as in the mirror head or the mounting structure) or at any suitable position elsewhere at the vehicle, such as at a windshield mounted electronics module or forward viewing camera module 28 or at a central controller of the vehicle. The ECU 24 may communicate with the air quality sensing device 26 to receive the captured sensor data in any suitable manner, such as via a wire or cable (e.g., a coaxial cable or twisted wire pair or the like) or a communication network of the vehicle, such as a LAN or CAN bus of the vehicle.

The air quality sensing device 26 receives or captures a sample of air from within the interior cabin of the vehicle and the system processes the sample of air to determine a level of contaminants or harmful gas (e.g., CO) within the sample, which may be representative of a level of contaminants or harmful gas at the interior of the vehicle. The air quality sensing device 26 may utilize aspects of known gas sensing devices. For example, the air quality sensing device 26 may be a nondispersive infrared (NDIR) sensor that includes an infrared (IR) light emitter or IR light source, an IR detector, and an optical chamber that allows ambient air to pass in front of an optical filter. The IR light source emits a continuous beam of IR light inside the optical chamber and the detector measures the amount of IR light that passes through the optical filter. As the IR light passes along the length of the optical chamber, particular gasses absorb specific bands of IR light and allow the remaining wavelengths to pass through the optical filter. The IR detector measures the remaining amount of IR light and determines the amount of IR light absorbed, which is proportional to the concentration of gases in the sample of air within the optical chamber. The air quality sensing device may utilize characteristics of the sensing devices and systems described in U.S. Publication Nos. US-2024-0042826 and/or US-2024-0017610, which are hereby incorporated herein by reference in their entireties.

In the illustrated example, the air quality sensing device 26 is disposed at the interior rearview mirror assembly 10, such as at the rear surface of the mirror casing of the mirror head, so that the sensing device 26 may be in fluid communication with the ambient air of the cabin at a central location of the cabin. Optionally, the sensing device 26 may be disposed at any suitable location within the vehicle (e.g., at an elevated region of the vehicle cabin and in communication with the ambient air within the cabin), such as at an overhead console or the windshield mounted electronics module 28 or integrated with the heating, ventilation, and air conditioning (HVAC) system of the vehicle (such as at an air intake of the HVAC system).

The system may passively monitor air samples from the interior cabin of the vehicle, such that the sensing device 26 captures or measures the air sample as unassisted air flow in the cabin causes the air sample to flow to the sensing device 26. That is, the air quality sensing device 26 may always be in communication with the air inside the vehicle and, as air circulates throughout the vehicle, the sensing device 26 may constantly or episodically determine level of harmful gasses and/or contaminants within the air sample. Optionally, the system actively captures samples from the vehicle cabin, such that the air quality sensing device may include a collection device, such as a fan or suction device, that is operated to direct the sample of air to the air quality sensing device 26.

Based on detected levels of contaminants and/or harmful gasses within the cabin of the vehicle, the system determines that the air quality within the cabin is poor or reduced and the system generates an alert to the driver and/or occupants of the vehicle. That is, the system may generate the alert in response to determining that the level of harmful gas is greater than a threshold level, where the threshold level may be based on a level of the particular gas that is harmful to humans. For example, the system may generate the alert when the detected level of CO gas is greater than 70 parts per million, greater than 150 parts per million, greater than 200 parts per million, and the like. The system may generate the alert when the detected level of CO2 gas is greater than 500 parts per million, 1,000 parts per million, 1,500 parts per million, 5,000 parts per million, and the like. Optionally, detecting presence of any level of certain harmful gasses greater than about 0 parts per million (e.g., CO) may result in the system generating the alert to the driver. Optionally, the system may generate the alert responsive to determination that the level of contaminants in the air at the cabin of the vehicle is greater than a threshold level of contaminants (e.g., determination of particulates in the air greater than 50 parts per million, greater than 75 parts per million, greater than 100 parts per million, and the like).

When the system determines that the air quality within the cabin is poor and/or when the system determines presence of harmful gas (e.g., CO) within the cabin, the system generates an alert to the driver and/or occupants of the vehicle, such as an audible tone or message played through an audio system or speaker system of the vehicle. Optionally, the alert may include a visual signal, such as a message displayed at a display screen of the vehicle (e.g., an infotainment screen at a center console of the vehicle) and/or illumination of a visual icon (e.g., at the gauge cluster or dashboard or interior rearview mirror assembly of the vehicle). Further, the alert may include a haptic signal, such as at the steering wheel, driver and/or passenger seat, seatbelts of the vehicle, and the like. The alert may communicate to the driver that the air quality within the cabin is poor and the alert may include a message or recommendation to the driver, such as to replace the air cabin filter or to seek another route to avoid driving through an area with poor air quality.

Optionally, the system may trigger an evasive maneuver in response to determining the poor air quality and/or presence of harmful gas to reduce or mitigate potential harm to the occupant(s) that may arise from the poor air quality and/or presence of harmful gas. For example, the system may adjust operation of the HVAC system, such as to turn on or increase fan speed (or turn off or reduce fan speed) and/or to adjust the HVAC system between operating in an air recirculation mode (where air is recirculated from the cabin through the HVAC system and air cabin filter) and a fresh air mode (where air is drawn from exterior the vehicle and through the HVAC system into the cabin). Optionally, the system may open the windows and/or doors in response to determining poor air quality.

In some examples, the system may perform the evasive maneuver until the system determines that the air quality has improved. For example, in response to determining that the concentration of contaminants in the air is below the threshold level and/or determining that the harmful gas is no longer present in the air within the cabin, the system may adjust operation of the HVAC system back to its previous setting and/or close the windows and/or doors of the vehicle.

Optionally, the system may display information to the driver and/or occupants of the vehicle based on the determined concentration or presence of particulates and/or harmful gasses within the vehicle. For example, based on processing of the sensor data captured by the air quality sensing device 26, the system may generate graphical display images to display at a display screen within the vehicle, where the graphical display images include air quality metrics representative of the air quality within the cabin of the vehicle. The air quality metrics may include determined concentrations of particulates and/or harmful gasses within the vehicle and/or an icon or representation summarizing the overall air quality within the cabin, such as a green icon for safe air quality levels, a yellow icon for moderate air quality levels, and a red icon for dangerous air quality levels. The graphical display and/or icons may be displayed at any suitable location within the vehicle, such as at the instrument gauge cluster, a display screen at the interior rearview mirror assembly, the infotainment display screen, and the like. Optionally, the system is in wireless communication with a mobile device of the driver, such as via a remote server in communication with the mobile device, for displaying the air quality metrics to the driver via an application on the driver's mobile device.

Thus, the system includes the air quality sensor 26 that may detect harmful gas (e.g., CO) within the vehicle cabin and initiate passenger protection measures, such as to alert the driver and/or occupants with audio, visual, and/or haptic signals. Further, the system triggers evasive maneuvers like opening the windows and/or doors and/or turning on the air circulation fan of the HVAC system to improve ventilation of the cabin. The air quality sensor 26 captures sensor data that is processed by the data processor at the ECU to trigger the passenger alert system and/or evasive actuators. The ECU and/or sensor may be integrated with the vehicle network. For example, the ECU and/or sensor may be part of the front camera module or interior rearview mirror assembly (and may be part of or associated with a driver or occupant or cabin monitoring camera and/or system disposed at the interior rearview mirror assembly) as these systems are mounted high in the cabin and can easily integrate the CO sensor. Optionally, the system may include a standalone ECU and system within the vehicle cabin, such as for higher end vehicle models or trims. In some examples, the system includes a standalone module with sensor and buzzer, such as for entry level vehicles without advanced safety systems, and that may be provided as an aftermarket product.

The cabin monitoring system improves passenger safety and comfort with seamless integration of additional sensors into the vehicular systems that automates CO detection and prevention. The system may save lives and lower health risks associated with breathing particulate matter and/or harmful gasses (e.g., CO). The vehicular ECU may integrate and automate the system, reducing implementation costs.

Further, the vehicle may be in wireless communication with a remote server, such as a cloud-based data collection system, and the vehicle may transmit captured sensor data representative of the air quality within the cabin of the vehicle to the remote server. The remote server may receive sensor data from a plurality of vehicles in communication with the remote server. The remote server processes the sensor data from the plurality of vehicles to determine trends, such as to determine air quality in a geographical region based on sensor data from vehicles within or near the geographical region, or to determine a lung illness rate for occupants of the vehicles based on cabin air quality across the vehicles (e.g., a trend between time spent in the vehicle, an incidence rate of lung cancer across occupants, and the air quality of the cabins).

The remote server may determine a characteristic of the air quality within the cabin of the equipped vehicle based on processing of sensor data received from the plurality of vehicles. For example, the remote server may compare the air quality within the cabin of the equipped vehicle to air quality of other vehicles in the geographic region and determine that, if the air quality is worse in the equipped vehicle, that the poor air quality may be caused at the vehicle (e.g., an exhaust leak, a clogged or degraded air cabin filter, and the like). Based on determination that the poor air quality is isolated to the equipped vehicle, the remote server may instruct the system to generate the alert and/or take an appropriate mitigating action to increase environmental airflow to the cabin (e.g., open the vehicle windows, adjust the HVAC system to operate in the fresh air mode, and the like).

If the air quality is substantially similar at the equipped vehicle to air quality at other vehicles in the geographic region, the remote server may determine that the poor air quality is caused by environmental factors (e.g., a construction zone, high pollen, and the like). Based on this determination, the remote server may instruct the system to generate the alert and/or take an appropriate mitigating action to reduce environmental airflow to the cabin (e.g., adjust the HVAC system to operate in the cabin recirculation mode). The remote server may determine that the other vehicles are within the same geographic region as the equipped vehicle based on, for example, the other vehicles being within a threshold distance of the equipped vehicle (such as within a radius of 1,000 feet or 3,000 feet, or 1 mile or less, 5 miles or less, 10 miles or less, 50 miles or less, 100 miles or less and the like) or the other vehicles travelling along the same road or highway as the equipped vehicle. Further, the remote system may communicate with emergency services based on an elevated level of contaminants or harmful gas within the vehicle.

In some examples, the cabin monitoring system is integrated with or associated with a driver monitoring system (DMS) and/or occupant monitoring system (OMS) of the vehicle. For example, the mirror assembly 10 includes or is associated with the DMS, with the mirror assembly including a driver/occupant monitoring camera disposed at a back plate (and viewing through an aperture of the back plate) behind the reflective element 16 and viewing through the reflective element 16 toward at least a head region of the driver of the vehicle. The DMS may include an infrared light (IR light) or near infrared light (near IR light) emitter disposed at the back plate and emitting IR light or near IR light that passes through another aperture of the back plate and through the reflective element 16. Further, the ECU includes an image processor for processing image data captured by the DMS/OMS camera. Image data captured by the camera may be processed for a head and face direction and position tracking system and/or eye tracking system and/or gesture recognition system. The DMS camera and monitoring system and/or head and face direction and/or position tracking systems and/or eye tracking systems and/or gesture recognition systems may utilize aspects of the systems described in U.S. Pat. Nos. 11,827,153; 11,780,372; 11,639,134; 11,582,425; 11,518,401; 10,958,830; 10,065,574; 10,017,114; 9,405,120 and/or 7,914, 187, and/or U.S. Publication Nos. US-2024-0190456; US-2024-0168355; US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/666,959, filed May 17, 2024, now U.S. Pat. No. 12,534,021, and/or U.S. provisional application Ser. No. 63/641,574, filed May 2, 2024, and/or International Publication No. WO 2023/220222, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from a forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2024-0064274; US-2021-0162926; US-2021-0155167; US-2018-0134217 and/or US-2014-0285666, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at the interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2024-0064274; US-2021-0155167 and/or US-2019-0118717, which are all hereby incorporated herein by reference in their entireties.

The system may transmit captured sensor data from the air quality sensing device 26 and/or the DMS camera to the remote server. The remote server may process sensor data from the vehicle to monitor driver drowsiness and/or alertness, monitor passenger behavior, monitor air quality within the cabin and/or trigger the alert system, monitor oxygen (O2) levels within the cabin and maintain an optimal O2 level within the cabin via an oxygenator device at the vehicle. Optionally, the remote server processes sensor data received from a plurality of vehicles, such as to determine health trends between quality of air within the cabin and driver drowsiness and/or alertness, passenger behavior, and the like.

Optionally, the driver monitoring system or cabin monitoring system may process captured image data to identify the driver or a passenger within the vehicle, and the air quality sensing system may adjust one or more threshold levels of gasses or particulates based on the identified driver or occupant. For example, if the driver or occupant is identified as a person with a profile that indicates a lung issue or a heightened sensitivity to a particular gas or particulate, the system may generate an alert to that person or may generate an evasive action responsive to a lower threshold of the particular gas or particulate that the person is sensitive to. In other words, one or more profiles may be stored in memory and, based on determination that an identity of the driver and/or occupant of the vehicle corresponds to a stored profile, the threshold level of air particulates and/or harmful gas for triggering the alert and/or evasive maneuver may be adjusted, such as reducing the threshold levels if the profile identifies a health condition or sensitivity of the identified driver and/or occupant. Optionally, the DMS may categorize the driver and/or occupant (e.g., an elderly driver, or a child or infant) and the system may adjust the threshold level of air particulates and/or harmful gas based on the determined category of driver and/or occupant, such as to reduce the threshold levels if the driver and/or occupant is elderly or a child or infant.

The forward viewing camera module or windshield electronics module (WEM) may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:

an air sensing device disposed at a vehicular component, wherein the vehicular component is disposed within an interior cabin of a vehicle equipped with the vehicular cabin monitoring system;

wherein the air sensing device samples air at the vehicular component and generates sensor data representative of a sample of air at the vehicular component;

an electronic control unit (ECU);

wherein sensor data generated by the air sensing device is transferred to the ECU;

wherein the ECU comprises electronic circuitry and associated software;

wherein the electronic circuitry of the ECU comprises a data processor operable to process sensor data generated by the air sensing device and transferred to the ECU;

wherein the vehicular cabin monitoring system, at least in part via processing of sensor data generated by the air sensing device, determines a level of air contaminant within the interior cabin of the equipped vehicle, and wherein the level of air contaminant is indicative of at least one selected from the group consisting of (i) a level of contaminant particulates within the interior cabin of the equipped vehicle and (ii) a level of contaminant gas within the interior cabin of the equipped vehicle;

wherein the vehicular cabin monitoring system generates an alert to a driver of the equipped vehicle responsive to determination that the level of air contaminant is greater than a threshold level;

wherein the vehicular cabin monitoring system adjusts operation of a vehicular system responsive to the determination that the level of air contaminant is greater than the threshold level;

wherein the vehicular cabin monitoring system wirelessly transmits information pertaining to the determined level of air contaminant to a remote server, and wherein the remote server receives information pertaining to determined levels of air contaminant from vehicular cabin monitoring systems of a plurality of other vehicles;

wherein the remote server compares (i) the determined level of air contaminant within the interior cabin of the equipped vehicle and (ii) determined levels of air contaminant within interior cabins of at least some vehicles of the plurality of other vehicles; and wherein, responsive to the comparison being indicative of the level of air contaminant within the interior cabin of the equipped vehicle being different from the levels of air contaminant within interior cabins of at least some vehicles of the plurality of other vehicles, the vehicular cabin monitoring system adjusts operation of the vehicular system to increase flow of environmental air into the interior cabin of the equipped vehicle.

2. The vehicular cabin monitoring system of claim 1, wherein the vehicular component comprises a vehicular interior rearview mirror assembly of the equipped vehicle.

3. The vehicular cabin monitoring system of claim 1, wherein the vehicular component comprises a vehicular forward-viewing camera module of the equipped vehicle, and wherein the vehicular forward-viewing camera module is disposed at an in-cabin side of a windshield of the equipped vehicle.

4. The vehicular cabin monitoring system of claim 1, wherein the level of air contaminant is indicative of the level of contaminant gas within the interior cabin of the equipped vehicle, and wherein the contaminant gas comprises carbon monoxide (CO).

5. The vehicular cabin monitoring system of claim 4, wherein the threshold level of CO comprises 0 parts per million or greater.

6. The vehicular cabin monitoring system of claim 4, wherein the threshold level of CO comprises 70 parts per million or greater.

7. The vehicular cabin monitoring system of claim 1, wherein the level of air contaminant is indicative of the level of contaminant particulates within the interior cabin of the equipped vehicle, and wherein the threshold level comprises contaminant particulates of 50 parts per million or greater.

8. The vehicular cabin monitoring system of claim 1, wherein the vehicular system comprises a heating, ventilation, and air conditioning (HVAC) system of the equipped vehicle, and wherein the vehicular cabin monitoring system adjusts operation of the HVAC system of the equipped vehicle between (i) operating in an air recirculation mode and (ii) operating in a fresh air mode.

9. The vehicular cabin monitoring system of claim 1, wherein the vehicular system comprises a power window system of the equipped vehicle, and wherein the vehicular cabin monitoring system adjusts operation of the power window system to one selected from the group consisting of (i) lower one or more windows of the equipped vehicle and (ii) raise the one or more windows of the equipped vehicle.

10. The vehicular cabin monitoring system of claim 1, wherein the alert is generated within the interior cabin of the equipped vehicle, and wherein the alert comprises at least one selected from the group consisting of (i) an audio tone, (ii) an audio message, (iii) a haptic signal, (iv) an illuminated icon and (v) a graphical display image displayed at a display screen of the equipped vehicle.

11. The vehicular cabin monitoring system of claim 1, wherein the alert is generated at a mobile device associated with the driver of the equipped vehicle.

12. The vehicular cabin monitoring system of claim 1, wherein, responsive to the comparison being indicative of the level of air contaminant within the interior cabin of the equipped vehicle being the same as the levels of air contaminant within interior cabins of at least some vehicles of the plurality of other vehicles, the vehicular cabin monitoring system adjusts operation of the vehicular system to reduce flow of environmental air into the interior cabin of the equipped vehicle.

13. The vehicular cabin monitoring system of claim 12, wherein the vehicular cabin monitoring system adjusts operation of the vehicular system based in part on the comparison between the determined level of air contaminant within the interior cabin of the equipped vehicle and the determined levels of air contaminant within interior cabins of vehicles of the plurality of other vehicles that are located within a threshold distance of the equipped vehicle, and wherein the vehicular cabin monitoring system does not adjust operation of the vehicular system based in part on the comparison between the determined level of air contaminant within the interior cabin of the equipped vehicle to the determined levels of air contaminant within interior cabins of vehicles of the plurality of other vehicles that are located outside of the threshold distance of the equipped vehicle.

14. A vehicular cabin monitoring system, the vehicular cabin monitoring system comprising:

an air sensing device disposed at a vehicular component, wherein the vehicular component is disposed within an interior cabin of a vehicle equipped with the vehicular cabin monitoring system;

wherein the air sensing device samples air at the vehicular component and generates sensor data representative of a sample of air at the vehicular component;

an electronic control unit (ECU);

wherein sensor data generated by the air sensing device is transferred to the ECU;

wherein the ECU comprises electronic circuitry and associated software;

wherein the electronic circuitry of the ECU comprises a data processor operable to process sensor data generated by the air sensing device and transferred to the ECU;

wherein the vehicular cabin monitoring system, at least in part via processing of sensor data generated by the air sensing device, determines a level of contaminant particulates within the interior cabin of the equipped vehicle;

wherein the vehicular cabin monitoring system generates an alert to a driver of the equipped vehicle responsive to determination that the level of contaminant particulates is greater than a threshold level, and wherein the alert is generated within the interior cabin of the vehicle;

wherein the vehicular cabin monitoring system adjusts operation of a heating, ventilation, and air conditioning (HVAC) system of the equipped vehicle responsive to the determination that the level of contaminant particulates is greater than the threshold level, and wherein the vehicular cabin monitoring system adjusts operation of the HVAC system of the equipped vehicle between (i) operating in an air recirculation mode and (ii) operating in a fresh air mode;

wherein the vehicular cabin monitoring system wirelessly transmits information pertaining to the determined level of contaminant particulates to a remote server, and wherein the remote server receives information pertaining to determined levels of contaminant particulates from vehicular cabin monitoring systems of a plurality of other vehicles;

wherein the remote server compares (i) the determined level of contaminant particulates within the interior cabin of the equipped vehicle and (ii) determined levels of contaminant particulates within interior cabins of at least some vehicles of the plurality of other vehicles; and wherein, responsive to the comparison being indicative of the level of contaminant particulates within the interior cabin of the equipped vehicle being different from the levels of contaminant particulates within interior cabins of at least some vehicles of the plurality of other vehicles, the vehicular cabin monitoring system adjusts operation of the HVAC system to the fresh air mode to increase flow of environmental air into the interior cabin of the equipped vehicle.

15. The vehicular cabin monitoring system of claim 14, wherein the vehicular component comprises a vehicular interior rearview mirror assembly of the equipped vehicle.

16. The vehicular cabin monitoring system of claim 14, wherein the vehicular component comprises a vehicular forward-viewing camera module of the equipped vehicle, and wherein the vehicular forward-viewing camera module is disposed at an in-cabin side of a windshield of the equipped vehicle.

17. The vehicular cabin monitoring system of claim 14, wherein the threshold level comprises contaminant particulates of 50 parts per million or greater.

18. The vehicular cabin monitoring system of claim 14, wherein, responsive to the comparison being indicative of the level of contaminant particulates within the interior cabin of the equipped vehicle being the same as the levels of contaminant particulates within interior cabins of at least some vehicles of the plurality of other vehicles, the vehicular cabin monitoring system adjusts operation of the HVAC system to the air recirculation mode to reduce flow of environmental air into the interior cabin of the equipped vehicle.

19. The vehicular cabin monitoring system of claim 18, wherein the vehicular cabin monitoring system adjusts operation of the HVAC based in part on the comparison between the determined level of contaminant particulates within the interior cabin of the equipped vehicle and the determined levels of contaminant particulates within interior cabins of vehicles of the plurality of other vehicles that are located within a threshold distance of the equipped vehicle, and wherein the vehicular cabin monitoring system does not adjust operation of the HVAC based in part on the comparison between the determined level of contaminant particulates within the interior cabin of the equipped vehicle to the determined levels of contaminant particulates within interior cabins of vehicles of the plurality of other vehicles that are located outside of the threshold distance of the equipped vehicle.

20. A vehicular cabin monitoring system, the vehicular cabin monitoring system comprising:

an air sensing device disposed at a vehicular component, wherein the vehicular component is disposed within an interior cabin of a vehicle equipped with the vehicular cabin monitoring system;

wherein the air sensing device samples air at the vehicular component and generates sensor data representative of a sample of air at the vehicular component;

an electronic control unit (ECU);

wherein sensor data generated by the air sensing device is transferred to the ECU;

wherein the ECU comprises electronic circuitry and associated software;

wherein the electronic circuitry of the ECU comprises a data processor operable to process sensor data generated by the air sensing device and transferred to the ECU;

wherein the vehicular cabin monitoring system, at least in part via processing of sensor data generated by the air sensing device, determines a level of contaminant gas within the interior cabin of the equipped vehicle, and wherein the contaminant gas comprises carbon monoxide (CO);

wherein the vehicular cabin monitoring system generates an alert to a driver of the equipped vehicle responsive to determination that the level of contaminant gas is greater than a threshold level, and wherein the alert is generated within the interior cabin of the vehicle;

wherein the vehicular cabin monitoring system adjusts operation of a vehicular system responsive to the determination that the level of contaminant gas is greater than the threshold level;

wherein the vehicular cabin monitoring system wirelessly transmits information pertaining to the determined level of contaminant gas to a remote server, and wherein the remote server receives information pertaining to determined levels of contaminant gas from vehicular cabin monitoring systems of a plurality of other vehicles;

wherein the remote server compares (i) the determined level of contaminant gas within the interior cabin of the equipped vehicle and (ii) determined levels of contaminant gas within interior cabins of at least some vehicles of the plurality of other vehicles; and wherein, responsive to the comparison being indicative of the level of contaminant gas within the interior cabin of the equipped vehicle being different from the levels of contaminant gas within interior cabins of at least some vehicles of the plurality of other vehicles, the vehicular cabin monitoring system adjusts operation of the vehicular system to increase flow of environmental air into the interior cabin of the equipped vehicle.

21. The vehicular cabin monitoring system of claim 20, wherein the vehicular component comprises a vehicular interior rearview mirror assembly of the equipped vehicle.

22. The vehicular cabin monitoring system of claim 20, wherein the vehicular component comprises a vehicular forward-viewing camera module of the equipped vehicle, and wherein the vehicular forward-viewing camera module is disposed at an in-cabin side of a windshield of the equipped vehicle.

23. The vehicular cabin monitoring system of claim 20, wherein the threshold level of CO comprises 0 parts per million or greater.

24. The vehicular cabin monitoring system of claim 20, wherein the vehicular system comprises a heating, ventilation, and air conditioning (HVAC) system of the equipped vehicle, and wherein the vehicular cabin monitoring system adjusts operation of the HVAC system of the equipped vehicle between (i) operating in an air recirculation mode and (ii) operating in a fresh air mode.

25. The vehicular cabin monitoring system of claim 20, wherein the vehicular system comprises a power window system of the equipped vehicle, and wherein the vehicular cabin monitoring system adjusts operation of the power window system to one selected from the group consisting of (i) lower one or more windows of the equipped vehicle and (ii) raise the one or more windows of the equipped vehicle.

* * * * *